United States Patent
Raimann

(10) Patent No.: US 6,848,425 B2
(45) Date of Patent: Feb. 1, 2005

(54) FUEL INJECTION SYSTEM

(75) Inventor: Jürgen Raimann, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 55 days.

(21) Appl. No.: 10/381,774

(22) PCT Filed: Jun. 14, 2002

(86) PCT No.: PCT/DE02/02175

§ 371 (c)(1),
(2), (4) Date: Mar. 28, 2003

(87) PCT Pub. No.: WO03/027486

PCT Pub. Date: Apr. 3, 2003

(65) Prior Publication Data

US 2004/0094129 A1 May 20, 2004

(30) Foreign Application Priority Data

Aug. 29, 2001 (DE) ........................................ 101 42 299

(51) Int. Cl.$^7$ ............................................. F02M 55/02
(52) U.S. Cl. ..................................................... 123/470
(58) Field of Search ................................. 123/470, 467, 123/298, 468, 469

(56) References Cited

U.S. PATENT DOCUMENTS

| | | | | |
|---|---|---|---|---|
| 3,125,078 A | * | 3/1964 | Reiners | 123/468 |
| 4,296,887 A | * | 10/1981 | Hofmann | 239/397.5 |
| 4,487,178 A | * | 12/1984 | Neitz et al. | 123/276 |
| 4,506,645 A | * | 3/1985 | Hewlitt et al. | 123/470 |
| 4,528,959 A | * | 7/1985 | Hauser, Jr. | 123/470 |
| 5,878,719 A | * | 3/1999 | Nakagomi | 123/470 |
| 6,155,236 A | * | 12/2000 | Jehle et al. | 123/470 |
| 6,295,969 B1 | * | 10/2001 | Kato et al. | 123/470 |

FOREIGN PATENT DOCUMENTS

| | | |
|---|---|---|
| DE | 38 36 413 | 5/1990 |
| DE | 198 04 463 | 8/1999 |
| GB | 719 952 | 12/1954 |
| GB | 901 338 | 7/1962 |

* cited by examiner

Primary Examiner—Mahmoud Gimie
(74) Attorney, Agent, or Firm—Kenyon & Kenyon

(57) ABSTRACT

A fuel-injection system for an internal combustion engine comprises a fuel injector for injecting fuel into a combustion chamber, which is inserted in a receiving bore of a cylinder head of the internal combustion engine and sealed from the combustion chamber by a seal, a flame-proofing screen being arranged on the discharge-side of the fuel injector in the receiving bore, which shields spray-discharge orifices of the fuel injector from the combustion chamber of the internal combustion engine. The flame-proofing screen is arranged at a discharge-side end of the fuel injector or on a wall of the receiving bore of the cylinder head on the discharge-side of the fuel injector.

9 Claims, 3 Drawing Sheets

FUEL INJECTION SYSTEM

FIELD OF THE INVENTION

The present invention relates to a fuel injection system.

BACKGROUND INFORMATION

German Published Patent Application No. 198 04 463 describes a fuel-injection system for a mixture-compressing internal combustion engine having external ignition, which includes a fuel injector injecting fuel into a combustion chamber having a piston/cylinder configuration and a spark plug projecting into the combustion chamber. The fuel injector is provided with at least one row of injection orifices distributed across the circumference of the fuel injector. By selectively injecting fuel via the injection orifices, a jet-directed combustion method may be realized by a mixture cloud being formed using at least one jet.

What may be undesired about the fuel injector described in the aforementioned printed publication, in particular, is the deposit formation in the spray-discharge orifices of the fuel injector. These deposits may clog the orifices and cause an unacceptable reduction in the flow rate through the injector. This may lead to malfunctions of the internal combustion engine.

SUMMARY

An exemplary fuel injector according to the present invention may provide a flame-proofing screen, positioned downstream from the spray-discharge orifices, to lower the temperature of the flame front of the mixture cloud burning through in the area of the spray-discharge orifices to such a degree that no combustion residue may be deposited in the area of the spray-discharge orifices, thereby avoiding clogging of the spray-discharge orifices with coke residue.

The flame-proofing screen may either be affixed to the discharge-side end of the fuel injector or to the wall of the receiving bore of the cylinder head in which the fuel injector is mounted.

The flame-proofing screen may have the shape of a cone or a truncated cone, thereby allowing an uncomplicated and cost-effective production.

The cone or partial cone may have either a homogeneous slope with respect to the wall of the receiving bore or one or a plurality of slope changes, so that the height of the flame-proofing screen and, thus, the installation depth of the fuel injector, may be adapted to the requirements.

Furthermore, an exemplary refinement of the flame-proofing screen in the form of a sphere segment may be provided whose radius determines the installation depth of the fuel injector.

The flame-proofing screen may be configured in the form of partial screens which extend across a freely selectable angular range, the number of partial screens able to be adapted to the number of spray-discharge orifices, the discharge angle or the opening angle of the mixture cloud.

By a variable rise of the flame-proofing screen beyond the surface of the cylinder head, the protective function of the flame-proofing screen may be regulated at will.

DETAILED DESCRIPTION

Figure 1:
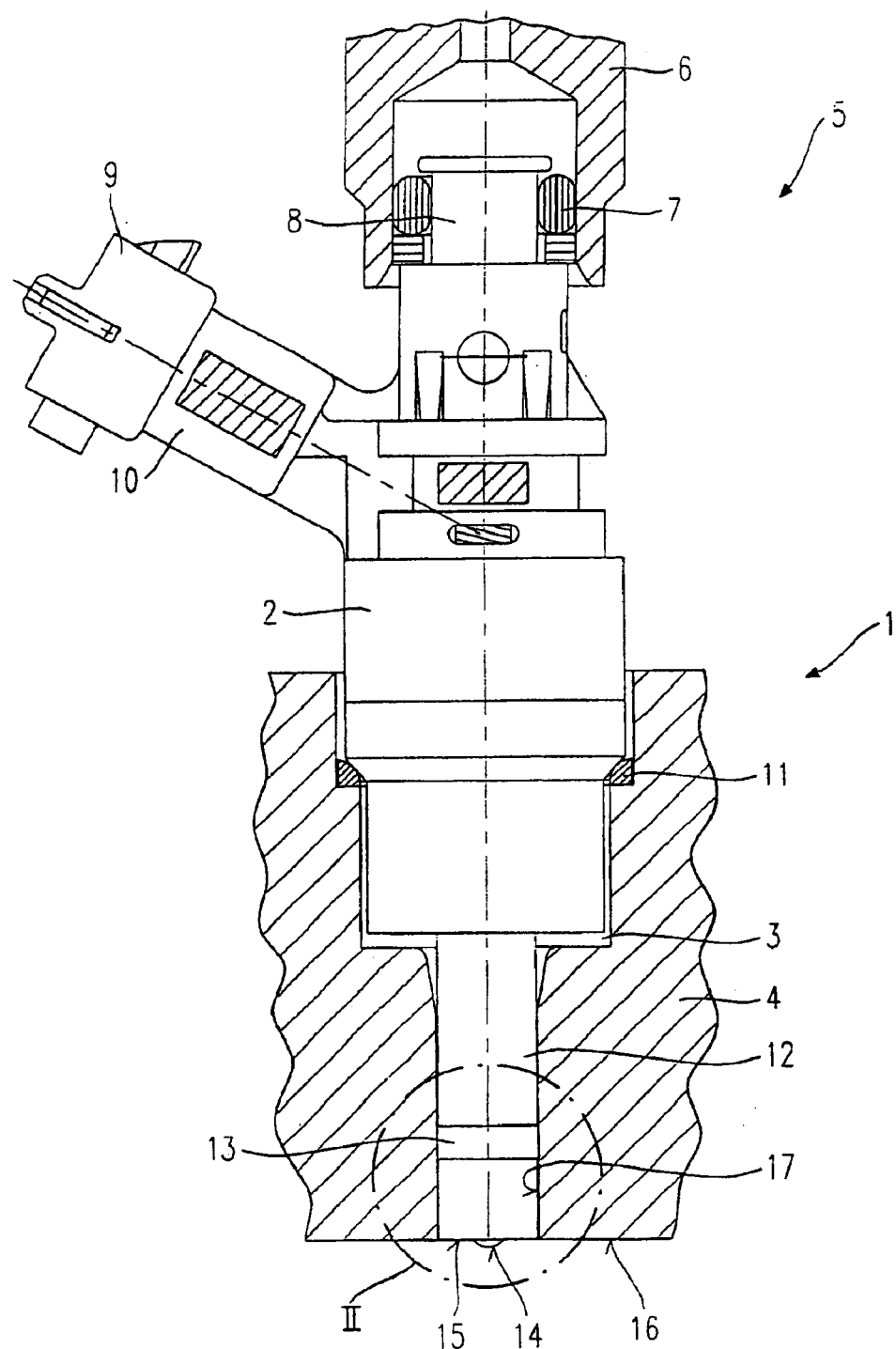
FIG. 1 shows a schematic section through an exemplary representation of a fuel-injection system suited for implementing the measures according to the present invention, in an overall view.

FIG. 1 shows a schematized and simplified view of a fuel-injection system 1 which includes a fuel injector 2 inserted in a receiving bore 3 of a cylinder head 4 of an internal combustion engine.

In this case, a fuel injector 2 is configured in the form of a directly injecting fuel injector 2, which may be used for the direct injection of fuel into a combustion chamber of a mixture-compressing internal combustion engine having external ignition. At an end 5 on the inflow-side, fuel injector 2 is provided with a plug connection to a fuel-distributor line 6, which is sealed by a seal 7 between fuel distributor line 6 and a supply connection 8 of fuel injector 2. Fuel injector 2 has an electrical connection 9 for an electric contacting for actuating fuel injector 2. Fuel injector 2 is provided, at least in its part projecting beyond cylinder head 4, with a plastic extrusion coat 10 which also encloses electrical connection 9.

Fuel injector 2 is held in place in cylinder head 4 and protected from twisting by measures such as a clamping shoe. An elastomeric ring 11 is provided in receiving bore 3 for centering and supporting fuel injector 2. At a nozzle body 12 of fuel injector 2, a sealing ring 13 is provided which seals fuel injector 2 from cylinder head 4 of the internal combustion engine. In a valve-seat member 14 of fuel injector 2, at least one spray-discharge orifice is formed, which is not visible in FIG. 1, through which the fuel is spray-discharged into the combustion chamber.

Figure 2A:
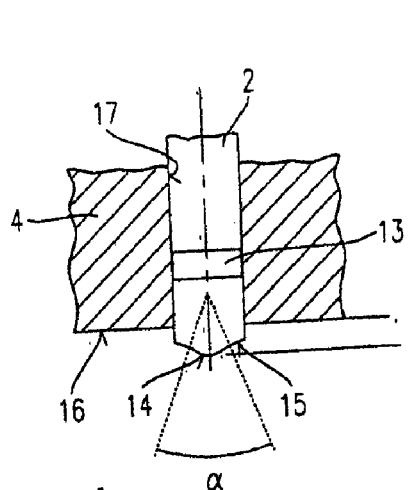
FIG. 2A shows a schematic section through the discharge-side section of the fuel injection system represented in FIG. 1, in region II in FIG. 1.
Figure 2B:
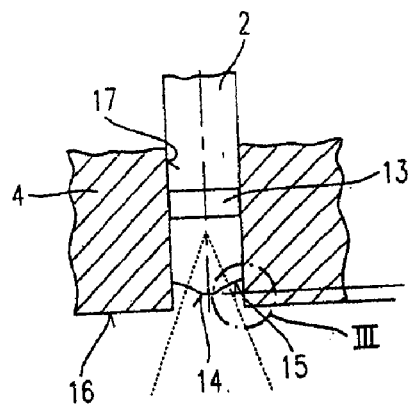
FIG. 2B shows the discharge-side section of the fuel-injection system shown in FIG. 1, with a fuel injector in an installed state which is adapted to the measures according to the present invention, in the same view as FIG. 2A.

As may also be seen in the enlarged representation in FIG. 2A, fuel injector 2 may be inserted in receiving bore 3 of cylinder head 4 so that a discharge-side end face 15 of fuel injector 2 ends flush with a top surface 16 of cylinder head 4 facing the combustion chamber, or even projects beyond it. This may be undesired with respect to the problem definition, namely reducing the coking tendency of fuel injector 2, so that, in order to apply the measures according to the present invention, fuel injector 2 is first mounted in receiving bore 3 of cylinder head 4, as shown in FIG. 2B, so that discharge-side end face 15 of fuel injector 2 is arranged in a recessed manner with respect to top surface 16 of cylinder head 4 facing the combustion chamber. The installation depth of fuel injector 2 depends on the opening angle α of the conical jet spray-discharged by fuel injector 2. Fuel injector 2 may be required to be inserted in receiving bore 3 so that a wall 17 of receiving bore 3 is not wetted by fuel.

By this system, a first improvement may be obtained in the coking tendency, since the spray-discharge orifices are shielded from the fuel flow in the combustion chamber by the recessed positioning of fuel injector 2 in receiving bore 3.

Figure 3A:
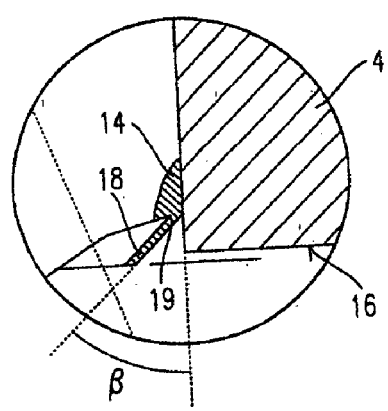
FIGS. 3A-C shows exemplary embodiments of a flame-proofing screen configured according to the present invention and mounted in each case at a discharge-side end of the fuel injector.
Figure 3B:
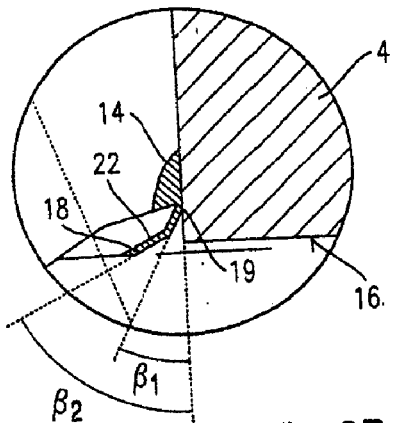
Figure 3C:
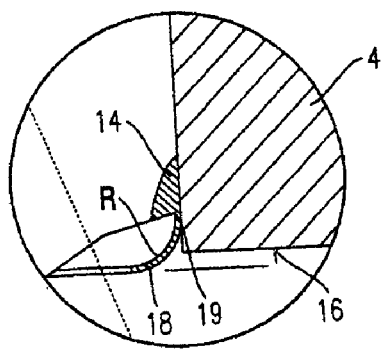
Figure 4A:
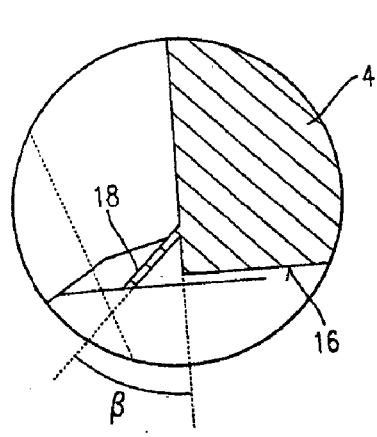
FIGS. 4A-C shows exemplary embodiments of a flame-proofing screen configured according to the present invention and mounted in each case on a wall of the receiving bore of the cylinder head that is adjacent to a discharge-side end of the fuel injector.
Figure 4B:
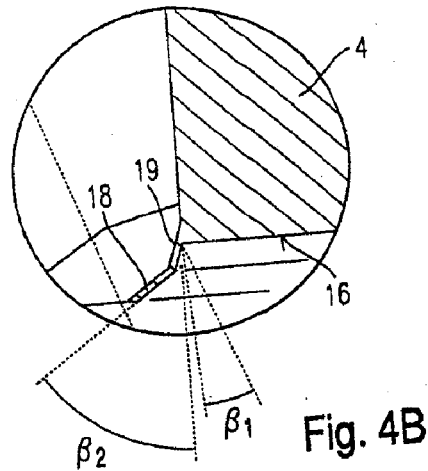
Figure 4C:
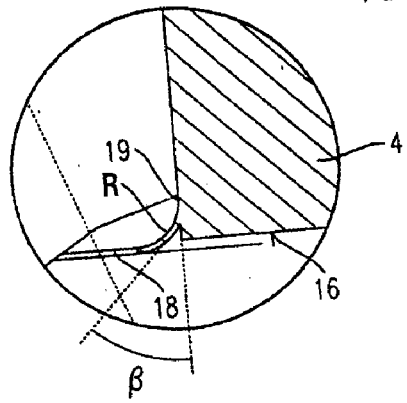

To further protect the spray-discharge orifices from coking, am example embodiment of the present invention may provide a flame-proofing screen 18 for fuel-injection system 1, which may either be formed on fuel injector 2, as shown in FIGS. 3A through 3C, or, as shown in FIGS. 4A through 4C, may be positioned on wall 17 of receiving bore 3 of cylinder head 4 downstream from valve-seat member 14.

By placing flame-proofing screen 18 downstream from the spray-discharge orifices, coke deposits may be reduced on the spray-discharge orifices. Since the diameter of spray-discharge orifices may amount to approximately 100 μm, the danger of the spray-discharge orifices getting clogged over time and the flow rate thereby being restricted to an unacceptable degree due to the formation of deposits, may be relatively high. This may be the result of the high temperatures during the through-ignition of the mixture cloud injected into the combustion chamber, since fuel components may thereby be deposited on the tip of fuel injector 2. By the mounting of flame-proofing screen 18, the surface temperature in the discharge region of the spray-discharge orifices may be reduced to such a degree that the spray-discharge orifices are unable to become clogged by coking residue. Flame-proofing screen 18 thus may prevent the propagation of the flame front in the region between flame-proofing screen 18 and the discharge-side end of fuel injector 2.

FIGS. 3A through 3C show the cut-out section designated III in FIG. 2B of different exemplary embodiments of flame-proofing screen 18 according to the present invention formed on fuel injector 2.

FIG. 3A shows a simple form which has a conical or truncated-cone-shaped configuration and extends in the discharge direction from the tip of fuel injector 2 in the direction of the combustion chamber. Tilt β of cone-shaped or truncated-cone-shaped flame-proofing screen 18 with respect to wall 17 of receiving bore 3 of the cylinder head may amount to between 0° and 90°. For better shielding, flame-proofing screen 18 may project beyond top surface 16 of cylinder head 4 facing the combustion chamber by a certain distance, this distance depending on the height of the cone projected on wall 17, or tilting angle β.

In FIG. 3B another exemplary form of flame-proofing screen 18 is shown, which may allow a greater installation depth of fuel injector 2 in cylinder head 4 while providing the same protective effect. In this case, cone-shaped or truncated-cone-shaped flame-proofing screen 18 is first tilted at a first angle $\beta_1$ at a projection 19, and at a second angle $\beta_2$ with respect to wall 17 of receiving bore 3 in the further course in a region 22 adjoining projection 19. Second angle $\beta_2$ may be larger than, or equal to, first angle $\beta_1$, the size of $\beta_2$ may be between 0° and 180° and the size of $\beta_1$ may be between 0° and 90°. The number of tilting changes may also be two or more, so that a plurality of regions having different tilts follow each another.

FIG. 3C shows a third exemplary embodiment of flame-proofing screen 18 according to the present invention. In this case, the form of a sphere segment was chosen whose radius R determines the height of flame-proofing screen 18 and, thus, the installation depth of fuel injector 2 in cylinder head 4.

Analogously to the exemplary embodiments shown in FIGS. 3A through 3C, in which the flame-proofing screen is formed on fuel injector 2 on valve-seat member 14, for instance, as schematically shown in FIGS. 4A through 4C, similar forms may be mounted on wall 17 of receiving bore 3 of cylinder head 4, downstream from fuel injector 2. For this purpose, cone-shaped, truncated-cone-shaped or sphere-segment shaped flame-proofing screen 18 may be fixed in place in a suitable manner on wall 17 and, depending on the requirements for the installation depth of fuel injector 2, projects beyond top surface 16 of cylinder head 4 facing the combustion chamber.

In FIG. 4A, flame-proofing screen 18 is mounted in the same position relative to top surface 16 of cylinder head 4 facing the combustion chamber as in the exemplary embodiment shown in FIG. 3A, while projection 19 of flame-proofing screen 18 shown in FIG. 4B is shifted in a direction of the outlet of receiving bore 3 into the combustion chamber. Projection 19 of flame-proofing screen 18 may be formed, for example, at the transition of wall 17 of receiving bore 3 to top surface 16 of cylinder head 4. This may allow tilting angles $\beta_1$ and $\beta_2$ to assume a larger angular range than in the exemplary embodiment shown in FIG. 3B. The size of $\beta_2$ may be between −90° and 270°, and the size of $\beta_1$ between −90° and 90°.

Figure 5:
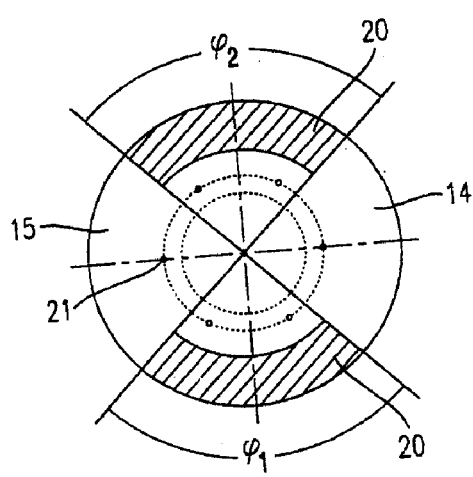
FIG. 5 shows a schematic plan view of the discharge-side section of the fuel injector, counter to the discharge direction.

For a simpler installation and the selected shielding of the tip of fuel injector 2 from the mixture flow in the combustion chamber, the afore-described exemplary embodiments of flame-proofing screens 18 configured according to the present invention may also be embodied in the form of partial screens 20, as shown in FIG. 5.

FIG. 5 shows as an example a fuel injection system 1 having a fuel injector 2 which has six spray-discharge orifices 21 arrayed in a circle, which are shielded by two partial screens 20 assuming an angular range of $\phi_1$ and $\phi_2$, respectively. These may not necessarily have the same size. The number of partial shields 20 may be freely selectable and may be adapted, for instance, to the number of spray-discharge orifices 21 or to the geometry of the mixture cloud injected into the combustion chamber. The angular expansion of n partial screens 20 in each case is $0° < \phi_n < 360°$. For $\phi = 360°$, partial screen 20 transitions into flame-proofing screen 18, which has already been described in FIGS. 3A through 3C and in 4A through 4C.

Figure 6:
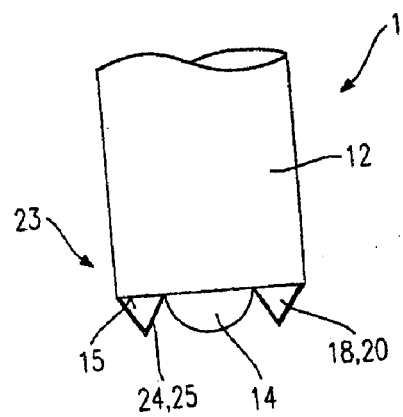
FIG. 6 shows a schematic view of the discharge-side end of the fuel injector with an exemplary embodiment of an additional screen or an extension of the flame-proofing screen.

FIG. 6 shows a further measure for improving the protective function of flame-proofing screen 18, 20. In this case, flame-proofing screen 18, 20 is provided with an additional screen 24 which is arranged radially inward in flame-proofing screen 18, 20 and extends up to the downstream end face 15 of valve-seat member 14. The hollow-conical configuration of the resulting overall screen 18, 20, 24 may allow a flow-dynamically improved shielding of spray-discharge orifices 21 of fuel injector 1.

A similar system may also be produced by providing flame-proofing screen 18, 20 with an extension 25 in the axial direction, formed in one piece with it, which is bent radially toward the inside and likewise extends up to downstream end face 15 of valve-seat member 14.

The present invention is not limited to the exemplary embodiments shown and is applicable to various forms of flame-proofing screens 18 able to be fixed in place as desired at wall 17 of receiving bore 3 or at the discharge-side end of the fuel injector 2, as well as to various designs of fuel injector 1.

What is claimed is:

1. A fuel-injection system for an internal combustion engine, comprising:
 a fuel injector configured to inject fuel into a combustion chamber, the fuel injector configured to be inserted in a receiving bore of a cylinder head of the internal combustion engine and having a discharge-side end;
 a seal for sealing the fuel injector from the combustion chamber;
 spray-discharge orifices; and
 a flame-proofing screen for shielding the spray-discharge orifices from the combustion chamber, the flame-proofing screen being arranged one of: i) at the discharge-side end of the fuel injector, and ii) on a wall of the receiving bore;
 wherein the flame-proofing screen has one of a multi-step cone shape and a multi-step truncated cone shape; and
 wherein the flame-proofing screen includes a projection and region adjoining the projection so that a first tilting angle formed between the projection and the wall of the receiving bore is smaller than a second tilting angle formed between the region and the wall.

2. The fuel-injection system according to claim 1, wherein a tilting angle of the flame-proofing screen is between 0° and 90°.

3. The fuel-injection system according to claim 1, wherein the one of the multi-step cone shape and the multi-step truncated cone shape of the flame-proofing screen includes two steps.

4. The fuel-injection system according to claim 1, wherein the flame-proofing screen is arranged at the discharge-side end, the first tilting angle is between 0° and 90°, and the second tilting angle is between 0° and 180°.

5. The fuel-injection system according to claim 1, wherein the flame-proofing screen is arranged on the wall of the receiving bore, the first tilting angle is between −90° and 90°, and the second tilting angle is between −90° and 270°.

6. The fuel-injection system according to claim 1, wherein the flame-proofing screen is divided into a plurality of partial screens.

7. The fuel-injection system according to claim 1, wherein the flame-proofing screen projects in a discharge direction beyond a top surface of the cylinder head facing the combustion chamber.

8. The fuel-injection system according to claim 1, further comprising:
 an additional screen arranged on a radially inner side of the flame-proofing screen to supplement the flame-proofing screen.

9. The fuel-injection system according to claim 1, wherein the flame-proofing screen, includes in an axial direction an extension which is radially bent toward an inside in a direction of the discharge-side end of the fuel injector.

* * * * *